US011884443B2

(12) United States Patent
Passarella

(10) Patent No.: US 11,884,443 B2
(45) Date of Patent: Jan. 30, 2024

(54) METHOD FOR LABELLING REELS

(71) Applicant: Fameccanica.Data S.p.A., San Giovanni Teatino (IT)

(72) Inventor: Fabio Passarella, San Giovanni Teatino (IT)

(73) Assignee: Fameccanica.Data S.p.A.

( * ) Notice: Subject to any disclaimer, the term of this patent is extended or adjusted under 35 U.S.C. 154(b) by 0 days.

(21) Appl. No.: 17/986,980

(22) Filed: Nov. 15, 2022

(65) Prior Publication Data

US 2023/0150708 A1 May 18, 2023

(30) Foreign Application Priority Data

Nov. 17, 2021 (EP) .................................... 21208682

(51) Int. Cl.

| | |
|---|---|
| ***B65C 9/04*** | (2006.01) |
| ***B65C 1/02*** | (2006.01) |
| ***B65C 9/30*** | (2006.01) |
| ***B65C 9/46*** | (2006.01) |
| ***B65H 75/18*** | (2006.01) |

(52) U.S. Cl.

CPC ................ *B65C 9/04* (2013.01); *B65C 1/021* (2013.01); *B65C 9/30* (2013.01); *B65C 9/46* (2013.01); *B65H 75/182* (2013.01)

(58) Field of Classification Search

CPC .... B65C 9/04; B65C 9/30; B65C 9/46; B65C 1/021; B65C 3/02; B65H 75/182; B65H 2801/75

See application file for complete search history.

(56) References Cited

U.S. PATENT DOCUMENTS

2018/0362280 A1* 12/2018 Pasqualoni ........... B29C 66/853

FOREIGN PATENT DOCUMENTS

| | | | |
|---|---|---|---|
| EP | 3808688 | A1 | 4/2021 |
| JP | H05147633 | A | 6/1993 |
| JP | H08133248 | A | 5/1996 |
| KR | 20030011467 | A | 2/2003 |

OTHER PUBLICATIONS

Translation of JPH08133248A, Fumiaki Fukushima, May 28, 1996 (Year: 1996).*

European Search Report dated Apr. 26, 2022. 4 pages.

* cited by examiner

*Primary Examiner* — George R Koch

(74) *Attorney, Agent, or Firm* — RMCK Law Group PLC

(57) ABSTRACT

A method for labelling reels, wherein a movable expansion shaft of a robot engages a first portion of a cylindrical inner surface of a reel and an application roller with a printed label retained thereon engages a second portion of the cylindrical inner surface and attaches the printed label on the second portion of the cylindrical inner surface.

8 Claims, 2 Drawing Sheets

METHOD FOR LABELLING REELS

CROSS-REFERENCE TO RELATED APPLICATION

This application claims priority to European Patent Application No. 21208682.1 filed Nov. 17, 2021. The disclosure of the above application is incorporated herein by reference in its entirety.

FIELD OF THE INVENTION

The present invention relates in general to the formation and handling of reels, in particular reels of web material such as, for example, non-woven webs, paper webs, elastic laminates, and the like.

More specifically, the invention relates to a method for labelling reels.

DESCRIPTION OF THE RELATED ART

A reel of web material generally has a tubular core, e.g. of cardboard, around which the web material is wound. Reels of web material are formed on a winding apparatus situated at the end of a production machine. The winding apparatus has a winding shaft on which an empty tubular core may be placed. In the winding apparatus the web material is wound around the tubular core until the desired dimension of the reel is reached. When the formation of the reel is completed, a robot picks-up the reel from winding shaft and transfers the reel to a transport unit.

The finished reels are usually labelled with labels bearing information on the reel, e.g. code of the material, production date and time, customer brand, etc.

In many cases, it is necessary to apply a label both on an external surface of the reel and on the inner surface of the tubular core. As a matter of fact, when the reel is used on a converting machine, the outer label is removed with the outer turns of the reel and the inner label makes it easier to identify the reel, for example when there are issues with faulty materials.

EP 3 808 688 A1 discloses a method and a system for applying labels on the inner surface of reels of web material, wherein a robot arm is inserted into the central core of a reel to move the reel from a first position to a second position and to simultaneously attach an inner label on the inner surface of the central core. The inner label is placed on the robot arm before the robot arm is inserted into the central core and the robot arm is used both to attach the inner label to the central core and to move the reel.

OBJECT AND SUMMARY OF THE INVENTION

The object of the present invention is to provide improved method and system for applying labels on inner surfaces of reels.

In accordance with the present invention, this object is achieved by a method having the features of claim 1.

Optional features of the invention form the subject of the dependent claims.

The claims are an integral part of the disclosure submitted in relation to the invention.

BRIEF DESCRIPTION OF THE DRAWINGS

Further characteristics and advantages of the invention will become clear from the following description, given purely as a non-limiting example, with reference to the attached drawings, wherein.

DETAILED DESCRIPTION

Figure 5:
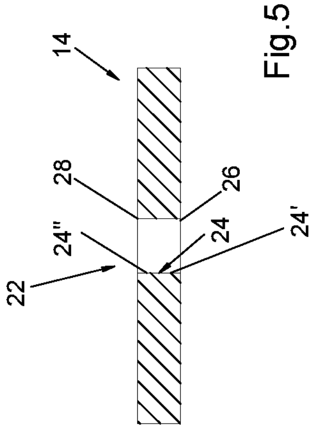
FIG. 5 is a schematic cross-section of a reel.
Figure 2:
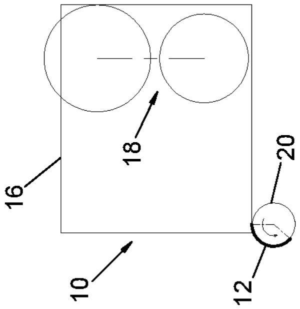
FIGS. 1 and 2 are schematic side views of a label printer in two operating positions.
Figure 1:
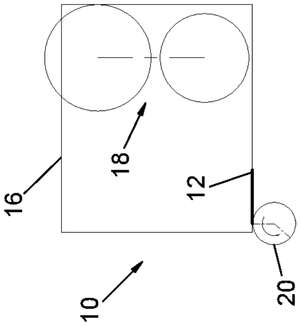

With reference to FIGS. 1-4, the numeral reference 10 indicates a label printer for printing labels 12 intended to be applied on reels 14 (FIG. 5). The labels 12 may be printed with specific data of the reels, for example code of the material, production date and time, customer brand, etc.

The printer 10 comprised a stationary housing 16 containing a printing mechanism 18 per se known. At the output of the printing mechanism 18 the printed labels 12 are wound on the outer surface of an application roller 20. The printed label 12 may have an adhesive surface facing outwards of the application roller 20.

The outer surface of the application roller 20 may be provided with holes connectable to a source of sub-atmospheric pressure to retain by suction a printed label 12.

In a possible embodiment, the holes on the outer surface of the application roller 20 may be selectively connectable either to a source of sub-atmospheric pressure to retain the printed label 12 by suction or to a source of pressurized air to release the printed label 12 by blowing.

Figure 3:
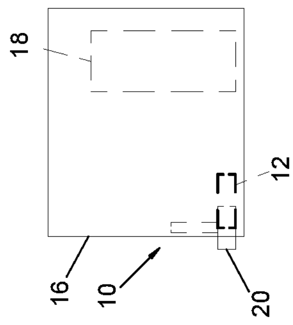
FIGS. 3 and 4 are schematic plan views of the label printer of FIGS. 1 and 2.
Figure 4:
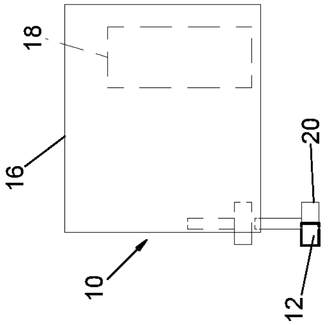

The application roller 20 is rotatable about its axis and may be movable between a retracted position shown in FIG. 3 and an extracted position shown in FIG. 4. In the retracted position the application roller 20 receives a printed label 12 from the printing mechanism 18. In the extracted position the application roller 20 transfers the printed label 12 to a reel 14 as it will be disclosed in the following.

With reference to FIG. 5, the reel 14 has a central hole 22 having a cylindrical inner surface 24 having first and second portions 24', 24" with respective first and second open ends 26, 28.

The reel 14 may be formed by a continuous web material wound to form a cylindrical reel. The continuous web material may be a non-woven material, an elastic laminate, a paper web, or the like. The continuous web material may be wound around a tubular core, e.g. of cardboard.

Figure 7:
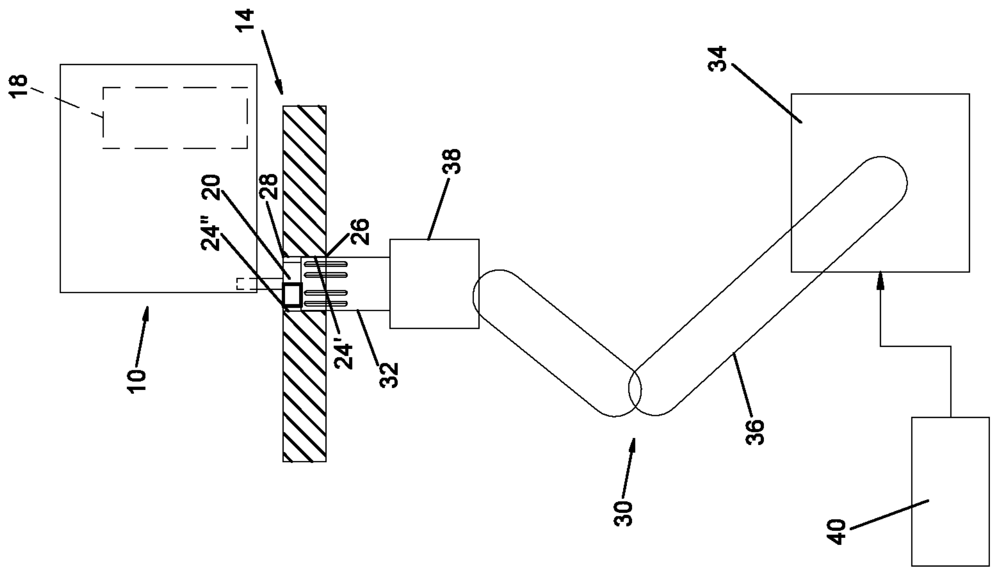
FIGS. 6 and 7 are schematic plan views showing a system for applying labels on a reel in two operating positions.
Figure 6:
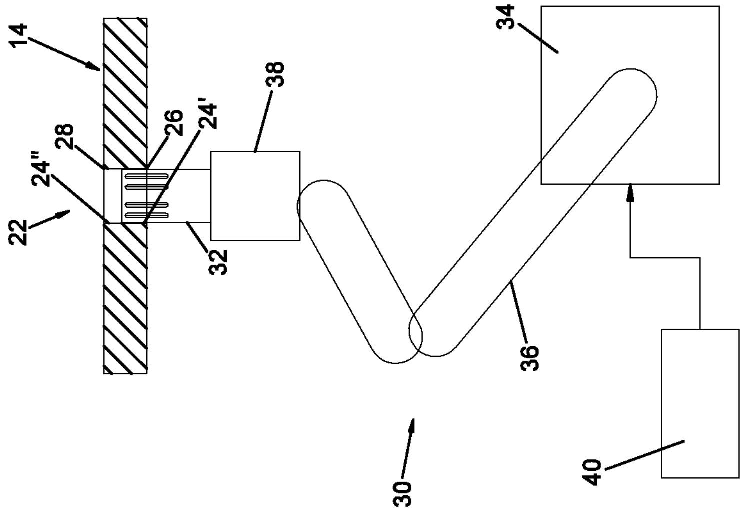

With reference to FIGS. 6 and 7, the reel 14 is picked-up and moved by a robot 30 having a movable expansion shaft 32 rotatable around its axis. The movable expansion shaft 32 has radially movable engagement elements configured for engaging the cylindrical inner surface 24 of the reels 14.

The robot 30 may comprise a base 34 and a movable arm 36. The movable arm 36 may have an end effector 38 which carries the movable expansion shaft 32.

The robot 30 and the printer 10 operate under the control of an electronic control unit 40, which is programmed to implement a method for applying labels on the inner surface 24 of reels 14 as described in the following.

In a first step an adhesive label 12 is printed with data of a specific reel. The printed label 12 is wound on the outer surface of the application roller 20, with the adhesive surface of the label 12 facing outwards of the application roller 20. The printed label 12 is retained on the outer surface of the application roller 20 by suction.

Then, the application roller 20 with the printed label 12 applied thereon is moved to the extracted position shown in FIG. 4. In the extracted position the application roller 20 extends outside the perimeter of the housing 16 of the printer 10.

In the meantime, the robot 30 picks up the reel 14 on which the printed label 12 is to be applied. The robot 30 may pick the reel 14 from a stack or from the winding shaft of a winding apparatus.

The movable expansion shaft 32 of the robot 30 is inserted into the central hole 22 of the reel 14 through the first open end 26 for a length less than the width of the reel 14, such that the movable expansion shaft 32 engages only the first portion 24' of the cylindrical inner surface 24 and the second portion 24" of the cylindrical inner surface 24 is not engaged by the movable expansion shaft 32, as shown in FIG. 6.

After having so engaged the reel 14, the robot 30 moves the reel 14 towards the printer 10. The robot 30 moves the reel 14 so that the application roller 20 is inserted into the central hole 22 of the reel 14 through the second open end 28 and engages the second portion 24" of the cylindrical inner surface 24, as shown in FIG. 7.

Then, the printed label 12 is attached by adhesive on second portion 24" of the cylindrical inner surface 24.

When the application roller 20 is engaged in the second portion 24" of the cylindrical inner surface 24 the printed label 12 may be released from the application roller 20 by blowing air through the holes formed on the outer surface of the application roller 20.

In a possible embodiment, the printed label 12 may be attached on the second portion 24" of the cylindrical inner surface 24 by moving the reel 14 in a plane orthogonal to the axis of the application roller 20 after inserting the application roller 20 with a printed label 12 retained thereon in the second portion 24" of the cylindrical inner surface 24.

The same system may be used to attach a second label on the outer surface of the reel 14. The second label is applied and retained on the outer surface of the application roller 20 as previously described. Then, the outer surface of the reel 14 is positioned in contact with the outer surface of the application roller 20. Then, the reel 14 and the application roller 20 are driven in rotation about the respective axes of rotation and the second label is attached by adhesive on the outer surface of the reel 14.

The method and system for labelling reels according to the present invention have the following advantages:

- the labels are printed, picked-up and applied to the reels without unnecessary movements; therefore, the risk of losing the labels is minimized, since preparation and application of the labels takes place on a fixed and non-mobile station;
- the label is applied to the reel directly by the application roller of the printer and is never touched by the expansion shaft that picks the reel, thus eliminating the risk of damaging the label;
- the end effector of the robot is simple since it does not require the tool for the application of the labels and the related vacuum pipes; this has the consequence of a reduced weight of the end effector which allows the use of a smaller and less expensive robot;
- the same system allows the application of labels both on inner and outer surfaces of the reels.

A possible embodiment relates to a system for labelling reels, comprising:

- at least one reel (14) having a central hole (22) having a cylindrical inner surface (24) having first and second portions (24', 24") with respective first and second open ends (26, 28),
- a robot (30) having a movable expansion shaft (32),
- a label printer (10) having an application roller (20), and
- an electronic control unit (40) comprising software with instructions to cause:
  - the robot to engage the first portion (24') of the cylindrical inner surface (24) of the reel (14) by said movable expansion shaft (32) and to leave the second portion (24") of the cylindrical inner surface (24) not engaged by the movable expansion shaft (32),
  - the label printer (10) to print a label (12) and to retain a printed label (12) on said application roller (20),
  - the robot (30) to move the reel (14) to engage the second portion (24") of the cylindrical inner surface (24) by said application roller (20) with a printed label (12) retained thereon, and
  - to attach the printed label (12) on said second portion (24") of the cylindrical inner surface (24) of the reel (14).

The application roller (20) may be provided on its outer surface with holes connectable to a source of sub-atmospheric pressure for retaining thereon a printed label (12) by suction.

Said holes of the application roller (20) may be selectively connectable to said source of sub-atmospheric pressure to retain by suction a printed label (12) and to a source of pressurized air to release the printed label (12) by blowing.

The application roller (20) may be movable between a retracted position for receiving a printed label (12) and an extracted position for releasing the printed label (12).

The software of the electronic control unit (40) may comprise instructions to cause the robot (30) to move the reel (14) in a plane orthogonal to the axis of the application roller (20) after inserting the application roller (20) with a printed label (12) retained thereon in the second portion (24") of the cylindrical inner surface (24).

The software of the electronic control unit (40) may further comprise instructions to cause the robot (30) to position the outer surface of the reel (14) in contact with the outer surface of the application roller (20) with a printed label (12) retained thereon and to rotate the reel (14) and the application roller (20) about respective axes of rotation to attach a second label onto an outer surface of the reel (14).

A possible embodiment may relate to a computer program configured for implementing a method according to the present invention.

Of course, without prejudice to the principle of the invention, the details of construction and the embodiments can be varied, even significantly, with respect to those illustrated here without departing from the scope of the invention as defined by the following claims.

The invention claimed is:

1. A method for labelling a reel that includes a central hole having a cylindrical inner surface having first and second portions with respective first and second open ends, the method comprising:

- engaging the first portion of the cylindrical inner surface by a movable expansion shaft of a robot and leaving the second portion of the cylindrical inner surface not engaged by the movable expansion shaft,
- printing a label in a label printer having an application roller, and retaining the printed label on said application roller,
- moving the reel by said robot and, while the robot is engaging the first portion of the cylindrical inner surface engaging the second portion of the cylindrical inner surface by said application roller with the printed label retained thereon, and attaching the printed label on said second portion of the cylindrical inner surface while the robot is engaging the first portion of the cylindrical inner surface.

2. The method of claim 1, wherein the printed label has an adhesive surface facing outwards of the application roller.

3. The method of claim 1, wherein the printed label is retained on said application roller by suction.

4. The method of claim 1, wherein the printed label is released from the application roller by blowing.

5. The method of claim 1, comprising attaching the printed label on said second portion of the cylindrical inner surface by moving the reel in a plane orthogonal to an axis of the application roller after inserting the application roller with the printed label retained thereon in the second portion of the cylindrical inner surface.

6. The method of claim 1, further comprising attaching a second label onto an outer surface of the reel by positioning the outer surface of the reel in contact with an outer surface of the application roller with the printed label retained thereon and by rotating the reel and the application roller about respective axes of rotation.

7. The method of claim 1, comprising moving said application roller from a retracted position to an extracted position before engaging the second portion of the cylindrical inner surface by said application roller.

8. The method of claim 1, comprising:

providing the reel with the central hole having the cylindrical inner surface having first and second portions with respective first and second open ends, providing the robot having the movable expansion shaft, and providing the label printer having the application roller.

* * * * *